United States Patent [19]

Shibata et al.

[11] Patent Number: 4,547,543

[45] Date of Patent: Oct. 15, 1985

[54] WATER-ABSORPTIVE CONTACT LENSES

[75] Inventors: Takanori Shibata; Masashige Yamanaka; Hiroyuki Kako, all of Nagoya, Japan

[73] Assignee: Toyo Contact Lens Co., Ltd., Nagoya, Japan

[21] Appl. No.: 669,374

[22] Filed: Nov. 8, 1984

[30] Foreign Application Priority Data

Dec. 27, 1983 [JP] Japan .................. 58-252028
Jul. 26, 1984 [JP] Japan .................. 59-156093

[51] Int. Cl.$^4$ ............................ C08F 26/02
[52] U.S. Cl. ............... 524/264; 524/258; 523/108; 351/160 R; 351/160 H
[58] Field of Search ........... 526/258, 264; 523/108; 351/160 R, 160 H

*Primary Examiner*—Paul R. Michl
*Assistant Examiner*—Alex H. Walker
*Attorney, Agent, or Firm*—Oblon, Fisher, Spivak, McClelland & Maier

[57] ABSTRACT

A water-absorptive contact lens made of a copolymer consisting essentially of:

(a) from about 50 to about 95 parts, by weight of the total monomer units, of hydrophilic monomer units consisting essentially of from about 25 to 100 parts, by weight of the total hydrophilic monomer units, of N-methyl-3-methylene-2-pyrrolidone represented by the formula:

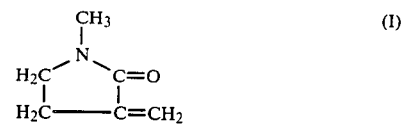

and from 0 to about 75 parts, by weight of the total hydrophilic monomer units, of N-vinyl-2-pyrrolidone; and (b) from about 5 to about 50 parts, by weight of the total monomer units, of reinforcing monomer units consisting essentially of at least one monomer selected from the group consisting of alkyl acrylates, alkyl methacrylates, styrene, alkyl styrenes, benzyl acrylate and benzyl methacrylate.

7 Claims, No Drawings

WATER-ABSORPTIVE CONTACT LENSES

The present invention relates to novel waterabsorptive contact lenses.

Heretofore, various water-absorptive contact lenses have been known. Most popular among them are contact lenses made of a polymer composed essentially of 2-hydroxyethyl methacrylate (hereinafter referred to simply as "2-HEMA") and having a water content of about 40% by weight.

However, the water-absorptive contact lenses of this type do not have adequate oxygen permeability and are incapable of supplying an adequate amount of oxygen physiologically required by the corneal tissues. Thus, they have a drawback that they can not be worn continuously for a long period of time, or if worn for a long period of time, they are likely to lead to metabolic trouble of the corneal tissues.

Under these circumstances, researches have been made on various contact lenses having high water-absorptivity to improve the water content and to supply an adequate amount of oxygen physiologically required by the corneal tissues, from the atmosphere to the corneal tissues via a substantial amount of water contained in the material constituting the contact lenses.

The most commonly employed as the material for highly water-absorptive contact lenses, is a copolymer composed essentially of N-vinyl-2-pyrrolidone (hereinafter referred to simply as "N-VP") as a highly hydrophilic monomer, copolymerized with an alkyl acrylate or methacrylate such as methyl methacrylate (hereinafter referred to simply as "MMA"). The highly waterabsorptive contact lenses made of copolymers of this type usually have an water-absorptivity of from about 50 to about 80% by weight and are thus capable of supplying an adequate amount of oxygen usually required by the corneal tissues, from the atmosphere to the corneal tissues via water-absorbed in the lens material.

However, such copolymers have drawbacks such that because of the difference in the polymerizability between the N-vinyl groups of N-VP and the acryloyl or methacryloyl groups of the alkyl acrylate or methacrylate, the polymer of N-VP and the polymer of the alkyl acrylate or methacrylate tend to undergo phase separation, whereby the transparency upon absorption of water tends to decrease, or the mechanical properties tend to be inferior. More specifically, the N-vinyl groups of N-VP have low polymerizability, and accordingly it is likely that the non-cross-linked N-VP polymer elutes, or the N-VP polymer tends to undergo phase separation, whereby the optical properties tend to be inferior.

Accordingly, it is an object of the present invention to overcome the above-mentioned drawbacks. The present inventors have found it effective for this purpose to employ instead of or in combination with N-VP, N-methyl-3-methylene-2-pyrrolidone (hereinafter referred to simply as "N-MMP") which has superior polymerizability and equal or superior hydrophilic nature as compared with N-VP. The present invention has been accomplished based on this discovery.

Namely, the present invention provides a process for a water-absorptive contact lens made of a copolymer consisting essentially of:

(a) from about 50 to about 95 parts, by weight of the total monomer units, of hydrophilic monomer units consisting essentially of from about 25 to 100 parts, by weight of the total hydrophilic monomer units, of N-methyl-3-methylene-2-pyrrolidone (i.e. N-MMP) represented by the formula:

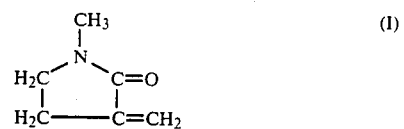

and from 0 to about 75 parts, by weight of the total hydrophilic monomer units, of N-vinyl-2-pyrrolidone (i.e. N-VP); and (b) from about 5 to about 50 parts, by weight of the total monomer units, of reinforcing monomer units consisting essentially of at least one monomer selected from the group consisting of alkyl acrylates, alkyl methacrylates, styrene, alkyl styrenes, benzyl acrylate and benzyl methacrylate.

Now, the present invention will be described in detail with reference to the preferred embodiments.

In N-MMP used as the hydrophilic monomer units in the present invention, the polymerizable group is an amide type $>C=CH_2$ group adjacent to a carbonyl group and thus highly copolymerizable when copolymerized with the alkyl acrylate or methacrylate used as the reinforcing monomer units. Accordingly, the resulting copolymer is very well cross-linked. Thus, even when a water-absorptive contact lens made of the copolymer thus obtained, is subjected to boiling and sterilizing treatment, the contact lens will remain stable, and there will be little possibility that a non-cross-linked N-MMP polymer elutes. By employing N-MMP having such properties, instead of or in combination with conventional N-VP, it is possible to obtain a waterabsorptive contact lens material having superior transparency and optical properties, which is free from undesirable phenomena such as the phase separation in the copolymer or white turbidity upon absorption of water which used to be observed. The water-absorptive contact lenses prepared from such a material will likewise have superior transparency and optical properties.

According to the present invention, N-MMP may be used alone as the hydrophilic monomer units, i.e. the hydrophilic monomer units may consist essentially solely of N-MMP. However, to improve the hardness of the polymer and the consequential dimensional stability of the contact lens, it is preferred that N-MMP is used in combination with N-VP. When N-MMP and N-VP are used in combination, the hydrophilic monomer units usually consist essentially of from about 25 to about 75 parts, preferably from about 30 to about 70 parts, by weight of the total hydrophilic monomer units, of N-MMP and from about 25 to about 75 parts, preferably from about 30 to about 70 parts, by weight of the total hydrophilic monomer units, of N-VP. If the amount of N-VP exceeds the above range, it is likely that phase separation will be brought about as between the polymer of N-VP as the hydrophilic monomer units and the polymer of the alkyl acrylate or methacrylate as the reinforcing monomer units, as mentioned above.

As the alkyl acrylate or methacrylate used as the reinforcing monomer units of the present invention, there may be mentioned alkyl esters of acrylic acid or methacrylic acid, wherein the alkyl group is a straight chain, branched or cyclo alkyl or halogenated alkyl group having from about 1 to about 18 carbon atoms. Specifically, there may be mentioned methacrylate compounds such as methyl methacrylate, ethyl methacrylate, propyl methacrylate, butyl methacrylate, pentyl methacrylate, hexyl methacrylate, heptyl methacrylate, octyl methacrylate, nonyl methacrylate, decyl methacrylate, dodecyl methacrylate, tetradecyl methacrylate, trifluoroethyl methacrylate, trifluorobutyl methacrylate, pentafluoroethyl methacrylate, pentafluorobutyl methacrylate and cyclohexyl methacrylate; and the corresponding acrylate compounds. These acrylates or methacrylates may be used alone or in combination as a mixture of at least two different kinds.

In order to obtain water-absorptive contact lenses of the present invention having superior mechanical properties such as hardness and strength, it is preferred to use at least two different kinds of alkyl acrylates or methacrylates in combination. Specifically, it is preferred that the reinforcing monomer units consist essentially of from about 25 to about 75 parts, more preferably from about 30 to about 70 parts, by weight of the total reinforcing monomer units, of a $C_1$–$C_3$ alkyl acrylate or a $C_1$–$C_3$ alkyl methacrylate and from about 25 to about 75 parts, more preferably from about 30 to about 70 parts, by weight of the total reinforcing monomer units, of a $C_8$ to $C_{18}$ alkyl acrylate or a $C_8$–$C_{18}$ alkyl methacrylate.

The above-mentioned two kinds of monomer units, i.e. the hydrophilic monomer units of N-MMP and N-VP and the reinforcing monomer units of the acryl acrylate or methacrylate, are used in a weight ratio of from about 50:50 to about 95:5, preferably from about 60:40 to about 90:10. If the amount of the alkyl acrylate or methacrylate is less than 5 parts by weight, relative to 100 parts by weight of the total amount of the two kinds of monomers, the strength tends to be poor. On the other hand, if the amount of the alkyl acrylate or methacrylate exceeds 50 parts by weight, the effectiveness of the highly hydrophilic nature of N-MMP and N-VP used in the present invention will be overcome, thus leading to a decrease of the water content and oxygen permeability, such being undesirable.

Further, with a view to improving the dimensional stability and the solvent resistance of the waterabsorptive contact lenses of the present invention, a cross-linkable monomer having at least two polymerizable functional groups is usually employed. As such a cross-linkable monomer, there may be mentioned polyethyleneglycol dimethacrylates such as ethyleneglycol dimethacrylate, diethyleneglycol dimethacrylate, triethyleneglycol dimethacrylate or tetraethyleneglycol dimethacrylate and the corresponding diacrylates; polypropyleneglycol dimethacrylates such as propyleneglycol dimethacrylate, dipropyleneglycol dimethacrylate or tripropyleneglycol dimethacrylate, and the corresponding diacrylates; vinyl methacrylate; vinyl acrylate; allyl methacrylate; allyl acrylate; divinyl benzene; diallyl phthalate; trimethylolpropane trimethacrylate; glycerol dimethacrylate; glycerol diacrylate; and 3-allyloxy-2-hydroxypropyl methacrylate. These cross-linkable monomers may be used alone or in combination as a mixture of at least two different kinds.

Particularly preferred among them are those having, as the polymerizable functional groups, acryl or methacryl groups which are highly reactive with both N-MMP and the alkyl acrylate or methacrylate used in the present invention.

The amount of such a cross-linkable monomer is usually from about 0.01 to about 5 parts by weight relative to 100 parts by weight of the total amounts of the above-mentioned hydrophilic monomer units of N-MMP and N-VP and the reinforcing monomer units of the alkyl acrylate or methacrylate.

In the present invention, the above-mentioned hydrophilic monomer units may partially be replaced by various hydrophilic monomers which are commonly used as components for the conventional water-absorptive contact lenses.

As such additional hydrophilic monomers, there may be mentioned, for instance, methacrylic acid, acrylic acid, 2-hydroxyethyl methacrylate, 2-hydroxyethyl acrylate, 2-hydroxypropyl methacrylate, 2-hydroxypropyl acrylate, ethyleneglycol monomethyl ether methacrylate and N,N-dimethylacrylamide. Such additional hydrophilic monomers may be used in an amount up to 20 parts by weight of the total amounts of the above-mentioned hydrophilic monomer units of N-MMP and N-VP.

As the reinforcing monomer units, the alkyl acrylate or methacrylate may be replaced partially or wholly by at least one of the following compounds having properties similar to the properties of the alkyl acrylate or methacrylate: styrene, an alkyl styrene such as α-methyl styrene, isopropyl styrene or t-butyl styrene, benzyl methacrylate and benzyl acrylate.

For the polymerization, there may be employed a usual polymerization initiator such as azobisisobutylonitrile, azobisdimethylvaleronitrile, t-butyl hydroperoxide, cumene hydroperoxide, benzoyl peroxide, acetyl peroxide, di-t-butyl peroxide, azodicyclohexylcarbonitrile, dimethyl azodiisobutyrate or succinperoxide. The polymerization initiator is used usually in an amount of from about 0.001 to about 5 parts by weight, preferably from about 0.01 to about 2 parts by weight, per 100 parts by weight of the total monomers.

The polymerization may be conducted by conventional bulk polymerization or solution polymerization. In the case of the solution polymerization, it is preferred to employ a solvent capable of dissolving all the monomers used for the polymerization, such as acetonitrile, N-methylpyrrolidone, dimethyl sulfoxide, dimethylformamide, ethanol or methanol. In either case, it is preferred to employ a temperature raising method wherein the polymerization is conducted under heating at a temperature of from about 40° to 50° C. for several hours to several tens hours and then the temperature is raised at a rate of about 10° C. per a few hours to complete the polymerization.

The above-mentioned polymerization may be conducted in a mold having a mold cavity corresponding to the desired contact lens to obtain a contact lens having a desired shape. Otherwise, the molded product may be shaped into a contact lens by mechanical processings such as cutting, grinding and polishing. The shaped product is permitted to swell upon absorption of water, whereby a desired water-absorptive contact lens is obtained.

The water-absorptive contact lens thus obtained is transparent and superior in the optical properties and has a water content as high as from about 55 to about 90% by weight and excellent oxygen permeability. Thus, it can be worn continuously for a long period of time. Further, by virtue of the excellent polymerizability of N-MMP, no substantial elution of a non-cross-linked N-MMP polymer is observed, and thus, the contact lens is highly safe to the eye tissues. Further, when N-MMP is used in combination with N-VP as the hydrophilic monomer units, it is possible to improve the mechanical properties such as the hardness and strength of the lens material and to improve the dimensional stability of the contact lens.

Now, the present invention will be described in further detail with reference to Examples and Comparative Examples. However, it should be understood that the present invention is by no means restricted by these specific Examples.

EXAMPLE 1

In a test tube made of polypropylene, 75 parts by weight of N-MMP, 25 parts by weight of dodecyl methacrylate, 0.3 part by weight of ethyleneglycol dimethacrylate and 0.1 part by weight of azobisisobutyronitrile as the polymerization initiator, were mixed and polymerized at 40° C. for 18 hours in a warm bath, at 50° C. for 8 hours in a warm bath, and at 50° C. for 4 hours in a hot air circulating dryer. Then, the temperature was raised to 110° C. at a rate of 10° C. every 1.5 hours to complete the polymerization.

Then, the polymer thus obtained was taken out from the polypropylene test tube, cured at 90° C. for 2 hours, and then fabricated into discs having a diameter of 12 mm and a thickness of 3.5 mm and into film discs having a diameter of 12 mm and a thickness of 0.2 mm. Various physical properties were measured, and the results are shown in Table 1.

By using the above-mentioned film discs, the physical properties were measured as follows:

Water Content (W.C.)

$$\text{W.C. (\% by weight)} = \frac{W - W_o}{W} \times 100$$

where W is the weight of the film disc which absorbed water to the equilibrium state (i.e. the weight of the water-absorbed film disc), and $W_o$ is the weight of the same film disc dried to a constant level of weight (i.e. the weight of the dried film disc).

Linear Swelling Rate (L.S.R.)

$$\text{L.S.R.} = \frac{\text{Diameter of the water-absorbed film disc}}{\text{Diameter of the dried film disc before swelling}}$$

Oxygen Permeability Coefficient (DK)

DK ($\times 10^{-10}$ ml $O_2$.cm/cm$^2$.sec.mmHg) was measured by Seikaken-type film oxygen permeability tester (manufactured by Rika Seiki Kogyo K.K.)

Needle Penetration Strength (N.P.S.)

N.P.S. (g) was measured by means of Instron-model compression tester. A needle having a diameter of 1/16 inch and a round tip was positioned at the center of the water-absorbed film disc, and a load was exerted on the other end of the needle to press the film disc with the round tip. The weight value (g) of the load at the time when the film disc was elongated and finally broken, was taken as the value of N.P.S.

Elongation (El.)

El. (%) was measured at the time when the film disc was elongated and finally broken in the above needle penetration strength test.

Rubber hardness (R.H.)

R.H. (degree) was measured in accordance with JIS K6301.

Visible Ray Transmittance (V.R.T.)

V.R.T. (%) of visible rays having wavelengths of 780–380 nm was measured by means of UV 240 manufactured by Shimadzu Corporation.

On the other hand, the above-mentioned discs having a diameter of 12 mm and a thickness of 3.5 mm were ground and polished into a shape of contact lenses and then permitted to swell in a physiological sodium chloride solution, whereby the desired water-absorptive contact lenses were obtained.

The contact lenses thus obtained were colorless and transparent, and satisfactory as water-absorptive contact lenses.

EXAMPLES 2 to 7 and COMPARATIVE EXAMPLES 1 and 2:

The monomer mixtures having the respective compositions as shown in Table 1 were polymerized in the same manner as in Example 1. The polymers thus obtained were processed into film discs having a diameter of 12 mm and a thickness of 0.2 mm. The physical porperties of the film discs were measured in the same manner as in Example 1. The results are shown in Table 1.

TABLE 1

| Examples | 1 | 2 | 3 | 4 | 5 | 6 | 7 | Comparative 1 | Comparative 2 |
|---|---|---|---|---|---|---|---|---|---|
| Components (parts by weight) | | | | | | | | | |
| N—MMP | 75 | 75 | 75 | 75 | 75 | 95 | 70 | — | — |
| N—VP | — | — | — | — | — | — | — | 75 | — |
| 2-HEMA | — | — | — | — | — | — | 3 | — | 75 |
| MMA | — | — | 25 | — | — | — | 13.5 | 25 | 25 |
| BuA | — | 25 | — | — | — | — | — | — | — |
| DMA | 25 | — | — | 25 | 25 | 5 | 13.5 | — | — |
| EDMA | 0.3 | 0.3 | 0.3 | — | — | 0.3 | 0.3 | 0.3 | — |
| AMA | — | — | — | 0.3 | — | — | — | — | 0.3 |
| VMA | — | — | — | — | 0.3 | — | — | — | — |
| A.I.B.N. | 0.1 | 0.1 | 0.1 | 0.1 | 0.1 | 0.1 | 0.1 | 0.1 | 0.1 |
| Physical properties | | | | | | | | | |
| W.C. (%) | 58.8 | 80.9 | 80.2 | 64.2 | 62.8 | 82.2 | 66.7 | 69.6 | 72.5 |
| L.S.R. | 1.34 | 1.78 | 1.71 | 1.40 | 1.40 | 1.78 | 1.46 | 1.46 | 1.50 |
| DK | 2.7 | 3.4 | 4.3 | 2.7 | 2.8 | 3.5 | 3.1 | 2.9 | 2.3 |
| N.P.S. (g) | 150 | 38.0 | 32.7 | 179 | 211.0 | 55.0 | 96.5 | — | 61.8 |
| El. (%) | 150 | 81 | 109 | 584 | 567 | 96 | 202 | 91.6 | 106 |
| R.H. | — | — | 7.4 | — | — | — | 12.5 | * | * |
| V.R.T. (%) | at least | at least | at least | at least | at least | at least | at least | at least | at least |

TABLE 1-continued

| Examples | 1 | 2 | 3 | 4 | 5 | 6 | 7 | Comparative 1 | Comparative 2 |
|---|---|---|---|---|---|---|---|---|---|
| | 95 | 95 | 95 | 95 | 95 | 95 | 95 | 95 | 95 |

Notes:
N—MMP: N—methyl-3-methylene-2-pyrrolidone
N—VP: N—vinyl-2-pyrrolidone
2-HEMA: 2-hydroxyethyl methacrylate
MMA: Methyl methacrylate
BuA: Butyl acrylate
DMA: Dodecyl methacrylate
EDMA: Ethyleneglycol dimethacrylate
AMA: Allyl methacrylate
VMA: Vinyl methacrylate
A.I.B.N.: Azobisisobutylonitrile
W.C.: Water Content (% by weight)
L.S.R.: Linear swelling rate
DK: Oxygen permeability coefficient DK ($\times 10^{-10}$ ml $O_2 \cdot$ cm/cm$_2 \cdot$ sec.mmHg)
N.P.S.: Needle penetration strength (g)
El: Elongation (%)
R.H.: Rubber hardness (degree)
V.R.T.: Visible ray transmittance (%)
—: Not measured
*: Not measurable Comparative Examples 1 and 2 are comparative with Example 3. Namely, N-VP is used instead of N-MMP, as the hydrophilic monomer. It is evident from the comparison of Example 3 with Comparative Examples 1 and 2 that Example 3 wherein N-MMP is used, is superior in the water content. In Comparative Examples 1 and 2 wherein N-VP is used, the rubber hardness was not measurable even when the water content was relatively low at about 70%, thus indicating poor dimensional stability when fabricated into contact lenses.

EXAMPLE 8

In a test tube made of polypropylene, 42.5 parts by weight of N-MMP, 42.5 parts by weight of N-VP, 7.5 parts by weight of MMA, 7.5 parts by weight of dodecyl methacrylate, 0.5 parts by weight of allyl methacrylate and 0.1 part by weight of azobisisobutyronitrile as the polymerization initiator, were mixed, and polymerized at 40° C. for 36 hours in a warm bath, at 50° C. for 8 hours in a warm bath, and at 50° C. for 4 hours in a hot air circulating dryer. Then, the temperature was raised to 110° C. at a rate of 10° C. every 1.5 hours to complete the polymerization.

Then, the polymer was taken out from the polypropylene test tube, cured at 90° C. for 2 hours, and then processed into discs having a diameter of 10 mm and a thickness of 3.5 mm and into film discs having a diameter of 10 mm and a thickness of 0.15 mm.

The physical properties of the film discs were measured in the same manner as in Example 1. The results are shown in Table 2.

On the other hand, the above-mentioned discs having a diameter of 10 mm and a thickness of 3.5 mm were ground and polished into a shape of contact lenses, and then permitted to swell in a physiological sodium chloride solution, whereby the desired water-absorptive contact lenses were obtained.

The contact lenses thus obtained were colorless and transparent, and satisfactory as water-absorptive contact lenses.

EXAMPLES 9 to 29

Monomer mixtures having the respective compositions as shown in Table 2 were polymerized in the same manner as in Example 8. The polymers thus obtained were processed into film discs having a diameter of 10 mm and a thickness of 0.15 mm. The physical properties of the film discs were measured in the same manner as in Example 1. The results are shown in Table 2.

TABLE 2

| Examples | 8 | 9 | 10 | 11 | 12 | 13 | 14 | 15 | 16 | 17 | 18 | 19 |
|---|---|---|---|---|---|---|---|---|---|---|---|---|
| Components (parts by weight) | | | | | | | | | | | | |
| N—MMP | 42.5 | 40.0 | 37.5 | 51.0 | 48.0 | 45.0 | 56.7 | 53.3 | 50.0 | 34.0 | 32.0 | 30.0 |
| N—VP | 42.5 | 40.0 | 37.5 | 34.0 | 32.0 | 30.0 | 28.3 | 26.7 | 25.0 | 51.0 | 48.0 | 45.0 |
| MMA | 7.5 | 10.0 | 12.5 | 7.5 | 10.0 | 12.5 | 7.5 | 10.0 | 12.5 | 7.5 | 10.0 | 12.5 |
| 3 FEMA | — | — | — | — | — | — | — | — | — | — | — | — |
| n-BuMA | — | — | — | — | — | — | — | — | — | — | — | — |
| OcMA | — | — | — | — | — | — | — | — | — | — | — | — |
| DMA | 7.5 | 10.0 | 12.5 | 7.5 | 10.0 | 12.5 | 7.5 | 10.0 | 12.5 | 7.5 | 10.0 | 12.5 |
| EDMA | — | — | — | — | — | — | — | — | — | — | — | — |
| AMA | 0.5 | 0.5 | 0.5 | 0.5 | 0.5 | 0.5 | 0.5 | 0.5 | 0.5 | 0.5 | 0.5 | 0.5 |
| A.I.B.N. | 0.1 | 0.1 | 0.1 | 0.1 | 0.1 | 0.1 | 0.1 | 0.1 | 0.1 | 0.1 | 0.1 | 0.1 |
| Physical properties | | | | | | | | | | | | |
| W.C. (%) | 76.2 | 72.9 | 69.0 | 76.6 | 72.3 | 68.5 | 76.9 | 72.6 | 68.8 | 75.3 | 71.6 | 68.6 |
| L.S.R. | 1.62 | 1.56 | 1.48 | 1.65 | 1.56 | 1.50 | 1.66 | 1.56 | 1.49 | 1.62 | 1.55 | 1.48 |
| DK | 4.3 | 3.6 | 3.8 | 3.8 | 3.6 | 3.4 | 3.7 | 3.9 | 3.5 | 3.8 | 3.5 | 3.5 |
| N.P.S. (g) | 58.7 | 92.7 | 94.8 | 48.7 | 71.3 | 90.7 | 42.3 | 64.5 | 82.3 | 68.0 | 80.0 | 97.0 |
| El. (%) | 112 | 159 | 140 | 107 | 158 | 173 | 127 | 158 | 191 | 105 | 113 | 113 |
| R.H. | 12.6 | 14.7 | 17.0 | 11.2 | 12.8 | 15.2 | 7.9 | 11.3 | 12.8 | 14.6 | 17.1 | 18.8 |
| V.R.T. (%) | at least 95 | at least 95 | at least 95 | at least 95 | at least 95 | at least 95 | at least 95 | at least 95 | at least 95 | at least 95 | at least 95 | at least 95 |

| Examples | 20 | 21 | 22 | 23 | 24 | 25 | 26 | 27 | 28 | 29 |
|---|---|---|---|---|---|---|---|---|---|---|
| Components (parts by weight) | | | | | | | | | | |

TABLE 2-continued

| | | | | | | | | | | |
|---|---|---|---|---|---|---|---|---|---|---|
| N—MMP | 28.3 | 26.7 | 25.0 | 40.0 | 40.0 | 40.0 | 85 | 85 | 85 | 75 |
| N—VP | 56.7 | 53.3 | 50.0 | 40.0 | 40.0 | 40.0 | — | — | — | — |
| MMA | 7.5 | 10.0 | 12.5 | — | — | — | — | — | 7.5 | 12.5 |
| 3 FEMA | — | — | — | — | — | 10.0 | — | — | — | — |
| n-BuMA | — | — | — | 20.0 | — | — | 15 | — | — | — |
| OcMA | — | — | — | — | 20.0 | — | — | 15 | — | — |
| DMA | 7.5 | 10.0 | 12.5 | — | — | 10.0 | — | — | 7.5 | 12.5 |
| EDMA | — | — | — | — | — | — | 0.3 | 0.3 | 0.3 | 0.3 |
| AMA | 0.5 | 0.5 | 0.5 | 0.5 | 0.5 | 0.5 | — | — | — | — |
| A.I.B.N. | 0.1 | 0.1 | 0.1 | 0.1 | 0.1 | 0.1 | 0.1 | 0.1 | 0.1 | 0.1 |
| Physical properties | | | | | | | | | | |
| W.C. (%) | 75.6 | 72.2 | 68.7 | 73.9 | 69.1 | 70.2 | 84.4 | 74.5 | 78.4 | 68.8 |
| L.S.R. | 1.62 | 1.55 | 1.49 | 1.60 | 1.50 | 1.52 | 1.84 | 1.60 | 1.67 | 1.48 |
| DK | 3.7 | 3.7 | 3.6 | 3.7 | 3.5 | 3.6 | 3.7 | 3.4 | 3.7 | 2.8 |
| N.P.S. (g) | 72.5 | 91.8 | 108.2 | 40.7 | 63.5 | 81.2 | 28.0 | 47.0 | 40.0 | 88.0 |
| El. (%) | 103 | 114 | 123 | 76 | 123 | 115 | 111 | 115 | 117 | 150 |
| R.H. | 15.5 | 18.0 | 20.5 | 11.2 | 13.0 | 15.4 | 5.5 | 5.9 | 7.0 | 8.6 |
| V.R.T. (%) | at least 95 | at least 95 | at least 95 | at least 95 | at least 95 | at least 95 | at least 95 | at least 95 | at least 95 | at least 95 |

Notes:
N—VP: N—vinyl-2-pyrrolidone
N—MMP: N—methyl-3-methylene-2-pyrrolidone
MMA: Methyl methacrylate
3 FEMA: Trifluoroethyl methacrylate
n-BuMA: n-Butyl methacrylate
DMA: Dodecyl methacrylate
EDMA: Ethyleneglycol dimethacrylate
AMA: Allyl methacrylate
A.I.B.N.: Azobisisobutyronitrile
W.C.: Water Content (% by weight)
L.S.R.: Linear swelling rate
DK: Oxygen permeability coefficient DK ($\times 10^{-10}$ ml $O_2 \cdot$ cm/cm$_2 \cdot$ sec.mmHg)
N.P.S.: Needle penetration strength (g)
El.: Elongation (%)
R.H.: Rubber hardness (degree)
V.R.T.: Visible ray transmittance (%)

We claim:

1. A water-absorptive contact lens made of a copolymer consisting essentially of:
   (a) from about 50 to about 95 parts, by weight of the total monomer units, of hydrophilic monomer units consisting essentially of from about 25 to 100 parts, by weight of the total hydrophilic monomer units, of N-methyl-3-methylene-2-pyrrolidone represented by the formula:

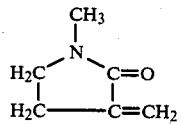

(I)

and from 0 to about 75 parts, by weight of the total hydrophilic monomer units, of N-vinyl-2-pyrrolidone; and
   (b) from about 5 to about 50 parts, by weight of the total monomer units, of reinforcing monomer units consisting essentially of at least one monomer selected from the group consisting of alkyl acrylates, alkyl methacrylates, styrene, alkyl styrenes, benzyl acrylate and benzyl methacrylate.

2. The water-absorptive contact lens according to claim 1, wherein the hydrophilic monomer units consist essentially solely of the N-methyl-3-methylene-2-pyrrolidone of the formula I.

3. The water-absorptive contact lens according to claim 1, wherein the hydrophilic monomer units consist essentially of from about 25 to about 75 parts, by weight of the total hydrophilic monomer units, of the N-methyl-3-methylene-2-pyrrolidone of the formula I and from about 25 to about 75 parts, by weight of the total hydrophilic monomer units, of N-vinyl-2-pyrrolidone.

4. The water-absorptive contact lens according to claim 1, wherein the reinforcing monomer units consist essentially of at least one monomer selected from the group consisting of alkyl acrylates and alkyl methacrylates.

5. The water-absorptive contact lens according to claim 1, wherein the reinforcing monomer units consist essentially of from about 25 to about 75 parts, by weight of the total reinforcing monomer units, of a $C_1$–$C_3$ alkyl acrylate or a $C_1$–$C_3$ alkyl methacrylate and from about 25 to about 75 parts, by weight of the total reinforcing monomer units, of a $C_8$–$C_{18}$ alkyl acrylate or a $C_8$–$C_{18}$ alkyl methacrylate.

6. The water-absorptive contact lens according to claim 1, wherein the copolymer includes (c) from about 0.001 to about 5 parts, by weight of the total monomer units, of at least one cross-linkable monomer selected from the group consisting of polyethyleneglycol dimethacrylates, polyethyleneglycol diacrylates, polypropyleneglycol dimethacrylates, polypropyleneglycol diacrylates, vinyl methacrylate, vinyl acrylate, allyl methacrylate, allyl acrylate, divinylbenzene, diallyl phthalate, trimethylolpropane trimethacrylate, glycerol dimethacrylate, glycerol diacrylate and 3-allyloxy-2-hydroxypropyl methacrylte.

7. The water-absorptive contact lens according to claim 1, wherein the hydrophilic monomer units contain up to 20 parts, by weight of the total hydrophilic monomer units, of at least one further hydrophilic monomer selected from the group consisting of 2-hydroxyethyl methacryate, 2-hydroxyethyl acrylate, 2-hydroxypropyl methacrylate, 2-hydroxypropyl acrylate, ethyleneglycol monomethyl ether methacrylate and N,N-dimethylacrylamide.

* * * * *